SUPERCONDUCTOR MAGNET AND METHOD

Filed Sept. 22, 1967

INVENTOR.
JOHN E.C. WILLIAMS
BY
Roland A. Anderson
Attorney 3,486,146
SUPERCONDUCTOR MAGNET AND METHOD John E. C. Williams, Cambridge, Mass., assignor to the United States of America as represented by the United States Atomic Energy Commission Filed Sept. 22, 1967, Ser. No. 669,955
Int. Cl. H01f *1/00, 7/00, 7/22*
U.S. Cl. 335—216 10 Claims

ABSTRACT OF THE DISCLOSURE

A thermal sink of high thermal conductivity and high thermal capacity in good thermal contact with a composite stabilized superconductor for providing improved cooling of the superconductor for producing coils with high field strength, low weight, low volume, and high current density.

BACKGROUND OF THE INVENTION

The invention described herein was made in the course of, or under a contract with the U.S. Atomic Energy Commission.

The generation of high magnetic fields by the use of superconductors is now established practice. Materials such as the compound niobium-tin or alloys of niobium-zirconium and niobium-titanium are capable of sustaining a lossless superconducting current in magnetic field strengths typically of up to 200 kilogauss and at absolute temperatures up to 18° Kelvin. As soon as the first superconducting coils were made, however, it became apparent that the performance of superconducting wire in the form of large coils was considerably below the performance of wire in the form of short samples. This degradation in performance has only recently been overcome by a technique that is here called "steady state stabilization."

Typically, superconducting materials such as niobium-zirconium and niobium-tin are capable of sustaining a superconducting current density of up to 1 million amperes per square centimeter. The ability of superconductors to sustain a lossless current leads to a special type of behavior in magnetic fields. The movement or change of a magnetic field in normal conducting materials gives rise to eddy currents which die out as a result of the resistance of the material. In superconductors, however, since there is no resistance to cause the decay of current, magnetic fields may be prevented from penetrating into the body of the superconductor until locally the current densities are equal to the maximum values which the superconductor can sustain. Thus, it has been shown both experimentally and theoretically that a magnetic field penetrates into superconductors such as niobium-tin and niobium-zirconium in such a way that locally the current density is equal to the maximum value which the superconductor can sustain at the local prevailing values of magnetic field strength and temperature. Thus, the magnetic flux density in a superconductor decreases from the outside towards the center of the superconductor and if the superconductor is sufficiently thick in section the magnetic flux density may even fail to zero.

Now, it is consequential that if the average flux density within a body is not simply proportional to the field strength outside it hysteresis is present and a result of a change in the external magnetic field strength is that heat is developed in the body. Thus, in a superconductor in which the magnetic flux density decreases with depth, heat will be developed in the superconductor if the external magnetic field strength changes. This heat will cause a temperature rise and a direct result of such a temperature rise is that locally the permissible current density is decreased. Thus it can be seen that a changing magnetic field can produce a run-away condition in a superconductor in which the heat liberated by a change in the magnetic field can cause a rise in temperature and hence a decrease in the permissible current density, which in turn leads to a further increase of the flux density within the superconductor. Such a sequence of cause and event can ultimately lead to a temperature rise so great that the superconductor is completely quenched, that is to say it is capable of carrying no superconducting current whatever.

Such a process is believed to occur in superconducting material in coils, although for a reason not yet clearly understood such processes do not appear to occur in short samples (of a few inches in length) of superconducting materials tested in externally applied magnetic field. Such then, is the nature of the instability in superconducting coils which has until recently limited their performance severely. However, a method of steady state stabilization was recently suggested and experimentally proven which allows superconducting materials to operate at their maximum possible currents in large coils. The principle employed in this form of stabilization is as follows. During an instability the current capacity of the superconductor decreases as the temperature rises. If no alternative path is provided for the current flowing through the superconductor, the temperature rise will be large and the superconductor will be completely quenched. If, however, an alternative path is provided for the current, the superconductor will recover from the thermal instability and under suitable thermal environments will cool to the initial low temperature. This is usually the temperature of helium boiling at atmospheric pressure, namely, 4.2° K. A suitable alternative path can be provided by shunting a superconducting wire with copper or some similar conductive normal material. In the system recently proposed for steady state stabilization, a superconducting wire is embedded in a copper conductor so that when an instability occurs in the superconductor the current is by-passed by the copper which in consequence heats up due to joule heating. The rise of temperature in the copper is limited by the cooling at the surface of the copper and providing this is good enough the temperature rise will be limited to a value less than the critical temperature of the superconductor. Under these conditions the superconductor although having undergone thermal instability will be able to cool and as it does so resume its function of a lossless current carrying element. Thus the current will commutate back from the copper into the superconductor after the thermal instability.

The basis for the calculation of the amount of copper needed is as follows. It is assumed that all the current that was initially flowing in the superconductor flows in the copper. Furthermore, it is assumed that if, under these conditions, the superconductor carrying no current is just below its critical temperature, complete commutation of the current from the copper back in the superconductor will occur. Thus, the condition for stability is that the current flowing in the copper produces a temperature rise of no more than the critical temperature of the superconductor. The mechanism by which the copper is cooled is assumed to be two-phase boiling heat transfer to liquid helium under steady state conditions.

This type of stabilization produces a composite, that is, a superconductor and a normal material electrically and thermally paralleled, which is stable no matter how long the thermal instability lasts in the superconductor. However, the amount of copper needed is large compared with the amount of superconductor and this results in a low overall current density.

For coils of large diameter or low field strength, low current density is not a severe disadvantage. However, for coils of high field strength or low weight or low volume high current density is a necessity.

It is the object of this invention to increase the current density in a composite superconductor by exploiting the basic characteristic of the instability of the superconductor wherein instabilities of only short duration occur;

It is a further object to provide a composite superconductor structure effectively cooled by a high thermal capacity, high specific heat sink in close contact therewith;

It is further object to increase the heat transfer coefficient of composite superconductor structures;

It is a still further object to provide a high field strength, low weight, low volume, high current density stabilized superconductor magnet.

SUMMARY OF THE INVENTION

The foregoing objects are achieved wherein a composite superconductor structure is effectively cooled by the thermal capacity of a low temperature, high volumetric specific heat sink having high thermal conductivity in a close connection therewith whereby the thermal sink material absorbs heat generated in the normal resistance component of the composite during the period of instability so as to keep the composite at a low temperature.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

BRIEF DESCRIPTION ON THE DRAWINGS

In the drawings where like elements are referenced alike:

DESCRIPTION OF THE PREFERRED EMBODIMENTS

Figure 1:
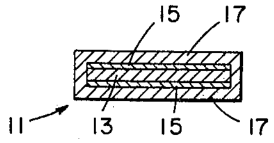
FIG. 1 is a partial cross-section of a stabilized, composite super conductor structure.

Referring to FIG. 1, composite superconductor ribbon 11, which is commercially available, comprises a metal alloy substrate 13 made for example of stainless steel or nickel base alloys suitable in reducing atmospheres, with a thickness of about two mils, having a thin superconductor film 15 layered thereon. One advantageous superconductor is niobium-tin, in the form of $Nb_3Sn$ as an intermetallic alloy. Since a coil made therefrom is subject to instabilities, comprising flux jump instabilities of short duration, e.g. about 1 millisecond, the ribbon type 11 usually has a plating 17 of silver one to two mils thick. This then constitutes a composite superconductor in which the silver plate carries the current during an instability in the niobium-tin coating. This composite is normally wound into a coil using an interlayer spacer consisting of either anodized aluminum foil or else a tape of copper sandwiched between two layers of an electrical insulator, such as polyester film.

The thermal capacities of aluminum and copper are low and the electrical insulation, such as polyester film, has low thermal conductivity. Thus in these systems of winding, the silver plate has a poor thermal sink for absorbing the heat generated by the superconductor instability. This results in low currents in this type of coil construction.

High purity metal foils having a low Debye temperature, such as cadmium, indium, and lead, together with an electrically insulating organic or inorganic film, are preferably used to form a heat sink.

Figure 2:
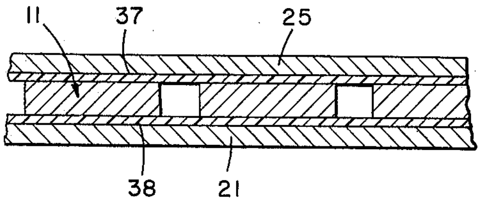
FIG. 2 is a partial cross-section of the composite of FIG. 1 in a coil provided with the heat sink of this invention.

In accordance with this invention, interleavings 21 and 25 of high purity metal foil, preferably of low Debye temperature less than 200° K. and electrically insulating films 37 and 38 thermally connect with the normal resistance, silver conducting layer 17 of ribbon 11 to provide a high thermal capacity heat sink for the transcient stabilization of the ribbin 11. To this end, as shown in FIG. 2, the metal sandwiches the ribbon 11 by providing an inner layer of metal on one side of ribbon 11 and another layer of metal on the opposite side of ribbon 11, and the films 37 and 38 electrically isolate the ribbon 11 from interleavings 21 and 25.

Figure 3:
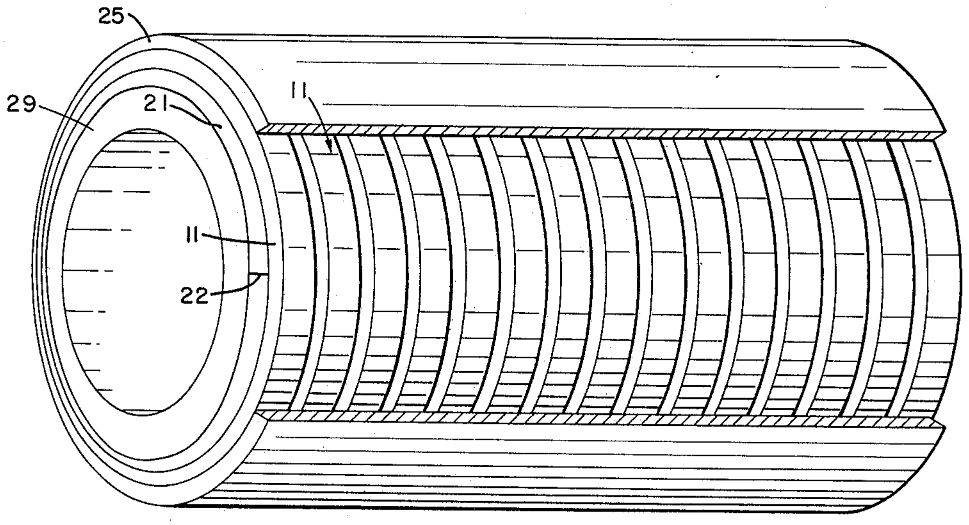
FIG. 3 is a partial three-dimensional view of the coil of FIG. 2.

A practical embodiment of a coil with the interleaving of this invention is shown in FIG. 3. An inner layer of lead foil interleaving 21 having a thickness of about 1 mil to about 5 mils of the same width as the coil form is wrapped tightly around coil form 29 so that the ends of the interleaving 21 form a butt joint 22. Over the lead foil interleaving 21 is wound a layer of superconductive ribbon 11 electrically insulated on both sides by continuous heat-sealable thin organic films 37 and 38 having a thickness of about 0.1 mil to about 0.5 mil of approximately the same width as the ribbon 11, an outer layer of lead foil interleaving 25 to wrapped around the insulated ribbon 11 so that its end are butt-joined. A layer of insulated superconductive ribbon 11 is then wound over interleaving 25 to form a second coil winding. By repeating the process, a coil of many layers is constructed.

To avoid any discontinuities which would break good continuous thermal contact between the superconductive ribbon and the lead foil it is essential to butt-joint the ends of the foil. To form a butt joint in the foil interleaving, a soft metal is preferred such as cadmium, indium, or lead. The high thermal capacity of the described lead foil heat sink, thereby serves the vital function of keeping the temperatures of the composite low by absorbing heat generated in the normal resistance component of the composite during the period of instability. Copper or aluminum will not serve this function to the same extent as high purity lead which has a low Debye temperature. It is also clear that high thermal conductivity is an essential property of the described thermal heat sink material, for the heat transferred to the surface of the material must be quickly conducted to the full width thereof so that the thermal capacity of the material is everywhere used to full advantage.

In actutal experiments, the transiently stabilized composite superconducting coil carries currents greater than currents that would have been carried had a copper-polyester sandwich or anodized aluminum interleaving been used. Furthermore, the overall current densities in said coil, even with thin organic films 37 and 38 between the respective lead layers 21 and 25 and the respective inner and outer surfaces of conductor 17, are also much higher than could otherwise have been achieved.

Niobium-zirconium and niobium-titanium superconductors also suffer from the same basic instability as niobium-tin superconductors. Transient stabilization can, therefore, also be applied to these materials in the form of ribbons.

This invention has the advantage of providing transient stabilization wherein a composite superconductor ribbon is effectively cooled by a heat sink. This cooling, moreover, is greater than by heat transfer directly from the ribbon to liquid helium. This invention also has the advantage of providing a superconductor coil that is effectively cooled to provide high field strength, low weight, low volume and high current density.

What is claimed is:

1. A method of winding a superconducting coil, subject to transient instabilities, comprising:
(a) wrapping a layer of metal heat sink material having a Debye temperature less than 200° Kelvin tightly around a coil form;
(b) butt-jointing the ends of said material around said form such that no gap is formed between said ends;
(c) electrically insulating a composite superconductor on both sides by a continuous film of insulating material of the same width as said superconductor;
(d) winding a layer of said insulated superconductor over said heat sink material;
(e) wrapping a second layer of said heat sink material around said insulated superconductor;
(f) butt-jointing the ends of said second layer of heat sink material around said form such that no gap is formed between said ends;
(g) winding a second layer of said insulated superconductor over said second layer of heat sink material; and
(h) repeating steps (a) through (g) inclusive to form a coil having a plurality of layers, thereby providing for good continuous thermal contact between said insulated superconductor and said heat sink material to give good transient cooling to said insulator superconductor.

2. The method of claim 1 wherein the electrical insulating material is an organic coating on the composite superconductor.

3. The method of claim 1 wherein the electrical insulating material is an inorganic coating on the metal heat sink material.

4. The method of claim 1 wherein the electrical insulating material is an organic film.

5. The method of claim 4 wherein the organic film is polyster film.

6. The method of claim 1 wherein the heat sink material is selected from that group consisting of cadmium, indium, and lead.

7. A superconducting magnet, comprising:
(a) A superconducting ribbon coil of uniform cross-section, having a first critical temperature, and formed in a helix with spaced apart turns;

(b) first and second superconducting sleeves, said sleeves having a second critical temperature and a Debye temperature of less than 200° K. said first sleeve being inside said helix and said second sleeve being outside said helix, thereby sandwiching said helix and forming a helical channel for the flow of cryogenic cooling fluid; and
(c) means for electrically insulating said coil from said sleeves.

8. The invention of claim 7 wherein each of said sleeves is a longitudinally split lead cylinder having a butt joint along the split.

9. The invention of claim 7 wherein said coil is a composite, stabilized, superconducting ribbon coil.

10. The invention of claim 8 wherein:
(a) Each of the sleeves has a thickness between 1 and 5 mils;
(b) the coil material includes a superconducting ribbon substrate with a silver coating; and
(c) the electrically insulating means is an organic insulation on the silver-coated ribbon, the insulation being between 0.1 and 0.5 mil thick.

References Cited

UNITED STATES PATENTS

| | | | |
|---|---|---|---|
| 3,394,330 | 7/1968 | Schnidler | 335—216 |
| 3,363,207 | 1/1968 | Brechna | 335—216 |
| 3,314,786 | 4/1967 | Kneip | 335—216 XR |
| 3,158,792 | 11/1964 | Swartz et al. | 335—216 |
| 2,936,435 | 5/1960 | Buck | 29—599 |

FOREIGN PATENTS

| | | |
|---|---|---|
| 1,452,977 | 8/1966 | France. |

OTHER REFERENCES

Handbook of Chemistry and Physics, 45th edition, p. D–86.

BERNARD A. GILHEANY, Primary Examiner

D. M. MORGAN, Assistant Examiner

U.S. Cl. X.R.

29—599